United States Patent

Rousseau

[15] 3,673,316

[45] June 27, 1972

[54] SWITCHING DEVICE FOR A DOUBLE OPERATION TELEGRAPHY SUBSCRIBER

[72] Inventor: Claude Rousseau, Joinville-Le-Pont, France

[73] Assignee: C.I.T.-Compagnie Industrielle des Telecommunications, Paris, France

[22] Filed: Nov. 28, 1969

[21] Appl. No.: 880,873

[30] Foreign Application Priority Data

Nov. 28, 1968 France ..............................68175811

[52] U.S. Cl. ..........................................................178/2 R

[51] Int. Cl. .......................................................H04l 17/16

[58] Field of Search..........................178/2 R, 3, 4.1 R, 69.6

[56] References Cited

UNITED STATES PATENTS

| | | | |
|---|---|---|---|
| 3,424,859 | 1/1969 | Bialo et al. | 178/3 |
| 3,059,048 | 10/1962 | Lamin et al. | 178/3 |

*Primary Examiner*—William C. Cooper
*Assistant Examiner*—Thomas W. Brown
*Attorney*—Craig, Antonelli & Hill

[57] ABSTRACT

Two-speed routing device for a telegraphic subscriber, enabling the use of the two modulation speeds, one called "-normal" and the other called "fast," the fee being different in each case; this device, placed in a link-up exchange, comprises a single line equipment set whose inputs are linked with the input distributor, and a call discriminator element which controls the tripping of a discriminator relay ensuring the changing from one speed of use to another.

10 Claims, 3 Drawing Figures

Patented June 27, 1972 3,673,316

3 Sheets-Sheet 1

SWITCHING DEVICE FOR A DOUBLE OPERATION TELEGRAPHY SUBSCRIBER

The invention concerns a switching device for a double operation telegraphy subscriber.

The device according to the invention concerns more particularly certain telegraphy subscribers having the possibility of using either normal operation at 50 bauds, for example, or high-speed operation at 200 bauds, for example. These subscribers have a double call number, one allocated to normal 50-baud communications and the other allocated to the high-speed 200-baud communications, but they have only a single line between their installation and the exchange.

It is therefore necessary that the charge assessing device at the exchange be able to attribute the communication to one or the other of the two subscriber call numbers, the charge obviously being different according to the type of operation, 50 or 200 bauds.

A discrimination based on the nature of the call currents is operated on arrival of a call at the exchange. At 50 bauds, the call is translated by permanent positive polarity on the line A wire following the permanent negative polarity; at 200 bauds, the call is translated by a positive polarity on the A wire of a duration of 80 milliseconds, followed by a negative polarity of a duration of 40 milliseconds. According to the nature of the call thus discriminated, switching is effected, the object of which is to direct the communication to one or the other of two input levels allocated to the subscriber on the subscriber selection switches, and each of which corresponds to one of his call numbers.

A switching or routing device is already known, the effect of which is to designate one or the other of the two line equipments allocated to a double operation subscriber, according to whether the latter calls at 50 or 200 bauds, each line equipment giving direct access to an input level of the subscriber selector switches. Its chief disadvantage is to insert the switching device between the input distributor of the lines and the line equipment. In practice, this arrangement in effect necessitates redoing entirely the wiring which normally existed between the input distributor and the line equipment, when double operation is introduced into the exchange after an initial installation in single operation for all the subscribers. There is the second disadvantage of requiring two line equipments when only one is obviously sufficient, since the subscriber can have only one communication at a time.

The device according to the invention permits the elimination of these disadvantages. The invention is more particularly characterized in that a single line equipment is used for a double operation subscriber, this equipment remaining in normal connection with the input distributor after the introduction of double operation.

According to another feature of the invention, a device discriminating the nature of the call (50 or 200 bauds) is added to the line equipment, the switching of the communication being operated at the output of the line equipment.

According to another feature of the invention, each double operation subscriber line has two input levels corresponding to the two subscriber call numbers, the two levels being multiplied together and connected to corresponding output wires of the line equipment, excepting with regard to the identification wire particular to each level and allocated to a type of operation, so that the charge assessing device is informed of the call number of the subscriber to be considered in making the charge.

According to another feature of the invention, the device discriminating the nature of the call (50 or 200 bauds) directly controls two relays, the call relay of the line equipment which is engaged always only in calling communication and the switching relay, which engages only in a 200 baud communication but in both calling and called subscriber communication.

According to another feature of the invention, the switching device allowing the use of only one call number is connected by a single level to the subscriber step-by-step selector switches and comprises only an identification circuit and a reading circuit.

According to another feature of the invention, a marking, presented by the route indicator on a wire of the subscriber's equipment, makes it possible to carry out either a single function or three different functions, according to whether the discriminator allocated to the equipment detects a normal or high-speed communication, the single function being the recording of the number of calling equipment in the cost-assessing circuit in both normal and high-speed communication, and the other two functions, in high-speed communication being the indication "high-speed rate" on the one hand to the route indicator and, on the other hand, to the charge-assessing circuit.

According to another feature, the call relay is connected directly to the telegraphic positive polarity received by the subscriber's equipment, and the call discriminator controls the discrimination relay solely when it detects a call for high-speed communication and permits holding of the call relay during the reception of the negative impulse in a request for high-speed communication.

According to yet another feature of the invention the discrimination relay does not intervene in the operation of the subscriber's equipment as called subscriber's equipment, the single reading circuit of the equipment not being connected to the said relay.

According to yet another feature of the invention, the equipment at the exchange of a double operation subscriber being carried into effect on "relay panels" and comprising his line equipment, the discriminator device and the switching relay, is such that it may be substituted for a "relay panel" of the initial installation equipped for two ordinary single-operation subscribers.

According to another feature, the call discriminator may be in the form of an independent circuit which may or may not be placed in position, by plugging-in for example.

Other features of the invention may be gathered from the following detailed description and the drawings given solely by way of non-restrictive examples, in which.

Figure 1:
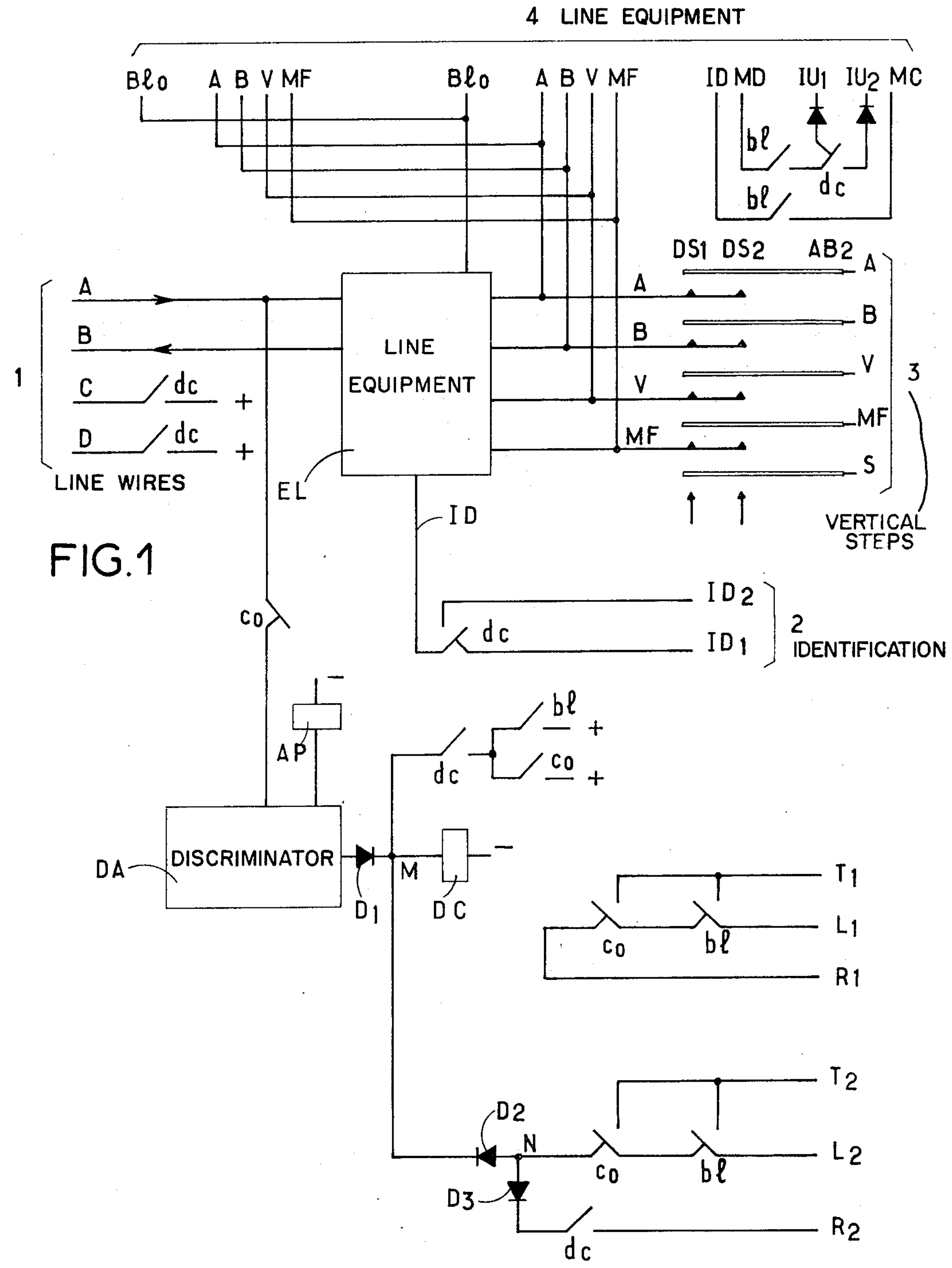
FIG. 1 shows a device according to the invention comprising two input levels, a discriminator ensuring the control of a call relay, irrespective of the type of communication.

In the embodiment shown in FIG. 1, wires A and B (reference 1) are line wires coming from the input distributor and passing through transfer panel jacks (not shown); wires C and D are used only in the case of 200-baud operation. These later wires permit the ground polarity of the exchange to be sent to the subscriber's installation to prevent perturbations due to different grounds.

A line equipment EL comprises only two conventional relays: a BL (blocking) relay, and a CO (connection) relay, a call relay AP being shown separately.

A call discriminator DA, preferably constructed in the conventional manner by electronic means, is connected to the wire A via a break contact *co;* this element is capable of distinguishing the nature of the subscriber's call, either 50 bauds or 200 bauds. It controls a detection relay DC via a diode $D_1$ and the point M when the call is a 200 baud call; it also controls the call relay AP both in the case of a 50-baud call and in the case of a 200-baud call. Wires $T_1$, $L_1$ and $R_1$ concern the called subscriber operation in the case of 50 bauds, and wires $T_2$, $L_2$ and $R_2$ concern the called subscriber operation in the case of 200 bauds. When the subscriber is the called subscriber, ground is connected to wire $L_1$ or to wire $L_2$ by a centralized element called a route indicator; in the case of 50 bauds, this ground is returned by the wire $R_1$ if the subscriber is free and by the wire $T_1$ if the subscriber is engaged or blocked. In the case of 200 bauds, the ground connected to the wire $L_2$ actuates the relay DC through the point N and a diode $D_2$ if the subscriber is free; the ground then returns on the wire $R_2$ via a diode $D_3$ and a make contact *dc;* if the subscriber is engaged or blocked, the ground returns on the wire $T_2$ by way of make contact *co* or *bl.*

The relay DC is held by its own make contact dc and either by the make contact *co* as soon as the connection relay is engaged, or by the make contact *bl* in case of blocking.

An identification wire ID connects ground to one of the wires $ID_1$ or $ID_2$ as soon as the call relay AP of the line equipment is engaged; ground polarity is connected to the wire $ID_1$ via a break contact *dc* if the call is a 50-baud call, it is connected to the wire $ID_2$ by a make contact *dc* if the call is a 200-baud call, as determined by the state of relay DC.

The two wires $ID_1$ and $ID_2$ are connected to the identification device (reference 2) which determines the call concerned (positioning of the horizontal steps).

The output of the line equipment EL is effected in four wires A, B, V, MF, corresponding to the vertical steps A, B, V, MF of the subscriber's selector switch AB2; each wire is multipled on two levels; the level $DS_1$ corresponds to the 50-baud discrimination, the level $DS_2$ corresponds to the 200-baud discrimination. The switch AB carries a fifth wire S which is intended to permit identification of the calling subscriber for the charge assessment device. The wire S is used similarly in called subscriber communication. The wire V permits connection of the relay CO of the line equipment by the register when the preselection is terminated; the wire MF permits faulting of the line equipment by the register; in this case, the blocking relay BL of the line equipment is engaged. Furthermore, the function of the three relays AP, B, V and MF connected to the respective lines is known, as already stated.

A branch of the wires A, B, V and MF, to which must be added a blocking wire Blo, is provided for subscriber's lines tests. The wires ID, MD, $IU_1$, $IU_2$ and MC form part of a marking circuit used for verifying the blocking and non-blocking by the relay BL of the line equipment (reference 4). Finally, the outputs of the vertical steps (reference 3) have access to the corresponding horizontal steps of the selector switches $AB_1$.

The mode of operation follows directly from the foregoing.

CALLING SUBSCRIBER

Case of 50 Bauds

The positive polarity connected to a route A, wire A, produces via the break contact co and discriminator DA pick-up of the call relay AP. The relay DC is not actuated, but obviously, the break contacts of the routing contacts of the relay DC are used, particularly for identifying the calling subscriber (wire $ID_1$). The connection of the horizontal lines, following the identification of the caller, is therefore effected on the level $DS_1$ corresponding to 50-baud operation. This level $DS_1$, on the wire S, is used from the registering device for determining the number of the caller with a view to entering him in the cost-charging device.

Case of 200 Bauds

Positive polarity of 80 milliseconds duration connected to route A followed by a negative polarity of 40 milliseconds produces, via the break contact *co* and the discriminator DA, pick-up of the call relay AP and of the detection relay DC. The make contacts of the relay DC are used for the identifier (wire $ID_2$), for transmitting ground polarity to the subscriber's installation (wire C and D) and for holding the relay DC by the connection relay CO. The operational process remains the same as for 50 bauds.

CALLED SUBSCRIBER

Case of 50 Bauds

The disengaged subscriber offers a loop $L_1R_1$ allowing the "reader" to appreciate his state and then giving the selection commencing order to the register. If the subscriber is engaged or blocked, the line equipment presents a loop $L_1T_1$ (relay CO or relay BL picked up) in the reader, allowing pick-up of its subscriber engagement relay and then its release.

Case of 200 Bauds

The earth connected to the wire $L_2$ produces, via the diode $D_2$, engagement of the relay DC. The disengaged subscriber then presents a loop $L_2R_2$ to the reader, allowing the latter to appreciate his state and to give the order to the register to commence the selections. If the subscriber is engaged or blocked, the line equipment presents a loop $L_2T_2$ (relay CO or relay BL picked up) in the reader which allows pick-up of its subscriber engagement relay, then its release.

Figure 2:
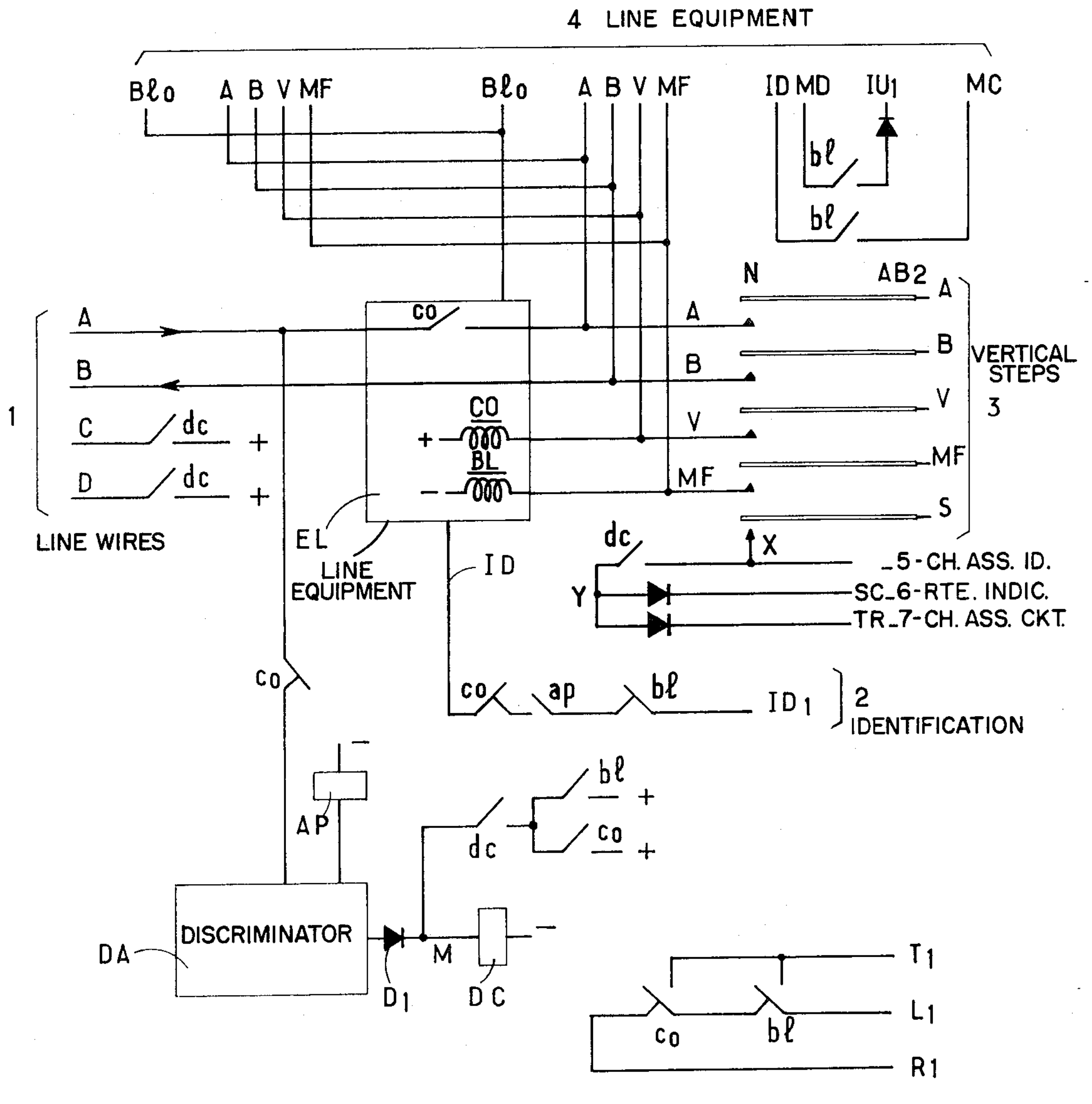
FIG. 2 shows a device comprising only one input level, a discriminator ensuring the control of a call relay, irrespective of the type of communication.

FIG. 2 shows a device comprising a single level N corresponding to a horizontal step of the selector switch $AB_2$. In the embodiment shown in FIG. 2, the wires A and B (reference 1) are the line wires coming from the input distributor and passing through disconnection jacks (not shown) of the transfer panel; wires C and D are used only in the case of 200-baud operation. The said wires permit ground polarity of the exchange to be transmitted to the subscriber's installation so as to prevent perturbations produced by different grounds.

A line equipment EL comprises no more than two conventional relays: a BL (blocking) relay, and a CO (connection) relay, a call relay AP being shown separately.

A call discriminator DA, preferably constructed in the conventional manner by electronic means, is connected to the wire A via a break contact *co;* this element is capable of distinguishing the nature of the call of the subscriber, either in 50 bauds or in 200 bauds. It controls a detection relay DC via a diode $D_1$ and the point M, when the call is in 200 bauds, it also controls the call relay AP in both the case of a 50-baud call and the case of a 200-baud call. Wires $T_1$, $L_1$ and $R_1$ concern called subscriber operation; when the subscriber is a called subscriber, ground is connected to wire $L_1$ via the reader by a centralized element called a route indicator; this ground returns by the wire $R_1$ if the subscriber is free and by the wire $T_1$ if the subscriber is engaged or blocked.

The relay DC is held by its own make contact dc and either by the make contact co as soon as the connection relay is engaged or by the make contact bl in the case of blockage.

An identification wire ID connects earth to a wire $ID_1$ as soon as the call relay AP of the line equipment is engaged. The wire $ID_1$ is directed towards the identification device (reference 2) which determines the call concerned (positioning of the horizontal steps) by the contacts co, ap, bl.

The output of the line equipment EL is effected in four wires, A, B, V, MF, corresponding to outputs of the vertical steps A, B, V, MF of the subscriber's selector switch $AB_2$; the wire V permits connection of the relay CO of the line equipment when the preselection is terminated; the wire MF permits faulting of the line equipment by the register; in this case, the line equipment blocking relay BL is engaged.

The wire S on the vertical step of $AB_2$ is intended to allow the charge-assessment identifier (reference 5) to identify the line equipment of the calling subscriber; a branch of this line at the point X is extended by a make contact of the relay DC and via two decoupling diodes $D_1$ and $D_2$, respectively, on the wires SC and TR, the wire SC terminating at the route indicator (reference 6) and the wire TR rejoining the charge-assessing circuit (reference 7).

A branch of the wires A, B, V, and MF, to which it is necessary to add a blocking wire Blo, is provided for testing subscribers' lines. The wires ID, MD, $IU_1$, and MC form part of a marking circuit used for verifying the blocking and non-blocking of the line equipment (reference 4) by the relay BL. Finally, the inputs of the vertical steps $AB_2$ (reference 3) have access to the corresponding horizontal steps of the selector switches $AB_1$.

The mode of operation is the same as in the case of FIG. 1; in caller operation, there is only one level N instead of the two levels $DS_1$ and $DS_2$ and the identification of the subscriber's number in the charge-assessment device is accomplished by means of the wire 5 in normal communication; in high-speed communication, the contact dc being closed, the wires 6 and 7 are connected to the point X, the wire SC serves for designating a routing itinerary for high-speed communication, while the wire TR makes it possible to indicate to the charge-assessment device the nature of the called connection; the circuit $L_1$,$R_1$,Tenables the reader to appreciate in all cases the state of the subscriber, as in the case of FIG. 1.

Figure 3:
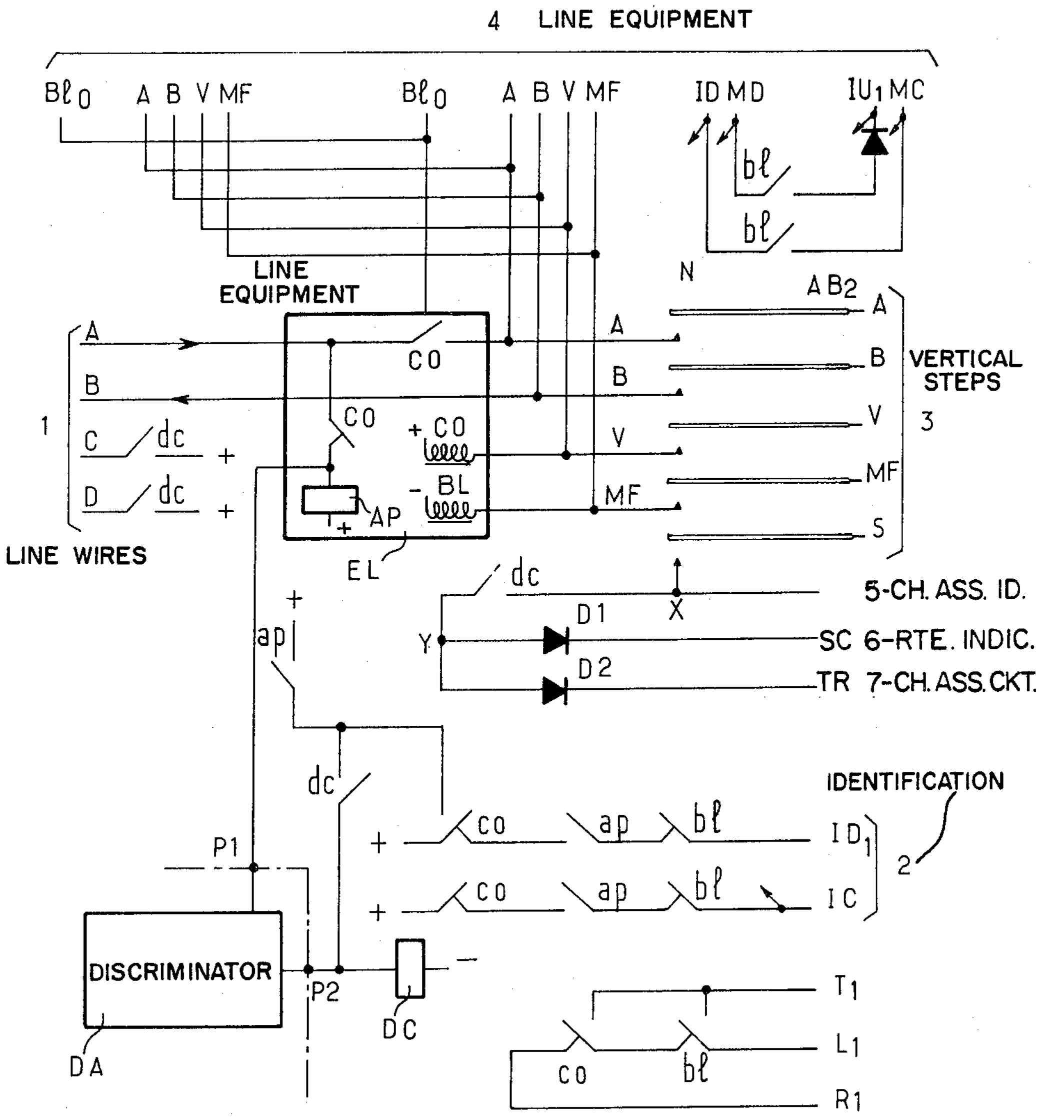
FIG. 3 shows a device comprising only one input level, a discriminator ensuring the holding of a call relay only in the case of a high-speed rate of communication.

In a preferred embodiment of the device according to the invention shown in FIG. 3, the wires A and B (reference 1) are line wires coming from the input distributor and passing through disconnection jacks (not shown) of the transfer panel; the wires C and D (reference 1) are possibly used in the case of 4-wire connection; they allow ground polarity of the exchange to be sent to the subscriber's installation for preventing perturbations produced by different grounds.

A subscriber's line equipment EL again comprises three relays: a BL (blocking) relay, a CO (connection) relay and a call relay AP.

A call discriminator DA, preferably constructed in the conventional manner by electronic means, is connected to the wire A via a break contact co of the relay CO, the call relay AP being connected in parallel to this connection. The call discriminator recognizes the calls for communication at high-speed modulation rate, the calls of which are distinct from calls at normal modulation rate; it controls a relay DC when the call characterizes a request for high-speed communication (positive and then negative impulse telegraph polarities followed by a permanent positive polarity), and holds the call relay AP during the negative impulse of the call for high-speed communication, this relay engaging for the two types of call and remaining engaged. The relay DC is held locally by its make contact *dc* associated with a make contact *ap* of the call relay during the establishment of the communication at the high-speed modulation rate, then a make contact *co* of the connection relay during the period of this communication.

The call discriminator, for example in the form of a modular plug-in card, is fitted on the subscriber's equipment by plugging into the circuit-closer, providing a detachable fixing shown symbolically by the points $P_1$ and $P_2$ of the drawing.

The wires $ID_1$ and IC lead to an identification device (reference 2) which determines the call concerned (positioning of the horizontal steps of the selector switches associated with the corresponding subscriber's line equipment) by the make contacts *co*, *ap* and *bl*.

The output of the subscriber's line equipment EL comprises four wires A, B, V, MF terminating at a level N corresponding to a horizontal subscribers' step of the selector switch $AB_2$, these wires being extended to the selector switch $AB_1$ (reference 3) on the connection of the vertical step $AB_2$. Wire V permits the connection of the relay CO of the line equipment when the preselection is terminated; the wire MF permits faulting by the register of the line equipment; in this case, the blocking relay of the line equipment engages, its function being known, as is also that of the relays AP and CO, as already stated.

The vertical step $AB_2$ carries a fifth wire S intended to enable the charge identifier (reference 5) to identify the calling subscriber's line equipment. A branch of the said wire S at the point X is extended by a make contact of the relay DC via two decoupling diodes $D_1$ and $D_2$, having their anodes connected to the point Y, on the wires SC and TR, respectively, the wire SC terminating at the route indicator (reference 6) and the wire TR rejoining the charge-assessment device (reference 7).

A branch of the wires A, B, V and MF, to which it is necessary to add a blocking wire Blo is provided for tests of subscribers' lines (reference 4). The wires ID, MD, $IU_1$ and MC are part of a marking circuit used for verifying the blocking and non-blocking of the line equipment by the relay BL.

The mode of operation of the device according to the invention in both cases of operation, normal communication and high-speed communication, the subscriber's equipment being either that of a calling subscriber or called subscriber, is the following, given as example:

Calling Subscriber

Normal communication (50 bauds for example). Permanent positive call polarity, applied to the route A, wire A, produces via the break contact co pick-up of the call relay AP. This relay, by the closure of its contacts ap, applies ground polarity to the wires IC and $ID_1$, producing identification of the calling subscriber's line equipment, and consequently the positioning of the horizontal steps (level N).

At the end of preselection, the connection of the subscribers' vertical steps is carried out, and a potential appears on the wire V actuating the relay CO of the equipment EL. Metallic continuity of the wires of lines A and B is then ensured between the caller and the register.

After reception of the dialing number, a marking made on the wire S by the route indicator is sent by the point X to the charge-assessment indicator (reference 5) for permitting identification of the number of the calling subscriber's equipment in the charge-assessment device. High-speed communication (200 bauds for example). The call is characterized by a positive polarity of 80 milliseconds followed by a negative polarity of 40 milliseconds, followed in turn by a permanent positive polarity. The call relay AP picks up via the break contact *co* on the positive impulse presented by the wire A; this relay is held by the discriminator during the negative impulse, then afterwards by the permanent positive polarity.

The relay DC is controlled by the call discriminator at the moment the latter detects a negative impulse. This relay is then held by the control of the call relay during the establishment of communication, then by the control of the connection relay during the period of the communication.

The identification of the calling subscriber's equipment, its connection for the purposes of preselection and the transfer of its number to the charge-assessment identifier are carried out as in the case of 50 baud operation.

The relay DC picked up on the call characterizing a request for 200-baud operation, permits the branching, by a make contact *dc*, of a marking of the wire S, on the one hand to the wire SC of the route indicator, via the diode $D_1$, and on the other hand to the wire TR passing to the charge-assessment device via diode $D_2$. Marking of the wire SC permits the route indicator to assign an itinerary for the 200-baud communications, and marking of the wire TR permits a discrimination to be delivered to the charge-assessment device indicating to it that the communication is being made at a high rate, for permitting a special perforation characterizing 200-baud operation on the charge-assessment tape.

Called Subscriber

The call discriminator is not concerned when the subscriber's line equipment operates for a called subscriber; this operation is identical in both cases of operation, high-speed or normal communication, and does not differ from the conventional subscriber's equipment having only one normal speed (50 bauds).

The called subscriber's equipment available has a loop $L_1R_1$ which enables the "reader" to appreciate the state of this equipment. If the subscriber is engaged or blocked, the subscriber's line equipment has a loop $L_1T_1$ (relay CO or BL engaged) to indicate the state of unavailability of the called subscriber.

The device according to the invention permits high flexiblity in use. In FIG. 3, it will be seen that it is possible to remove the discriminator DA, which is in the form, for example, of a plug-in printed-circuit panel; in the absence of the discriminator DA, the subscriber can obtain only 50-baud connections; when the subscriber decides to have both types of communication, all that is necessary is to plug in the call discriminator DA without any other modification in the wiring.

In FIG. 3, it will also be seen that it is possible for a subscriber to have only the high-speed type of communication if he so desires; for this purpose, it is merely necessary to remove the discriminator DA and circuit the contact *dc* between the points X and Y of the wires 5, 6 and 7; the subscriber must then call by sending a permanent positive polarity over wire A, reference 1, as in the case of normal communication.

Of course, the invention is by no means limited to the embodiments described and shown, which have merely been given as examples. In particular, without departing from the scope of the invention, it is possible to modify some arrangements or replace some means by equivalent means.

What I claim is:

1. A switching device for a double-operation telegraph subscriber exchange, permitting operation at two speeds, a normal-speed and a high-speed operation, said exchange being characterized in that it includes an input distributor, a call relay, a single line equipment having inputs connected to said input distributor, said switching device comprising a discrimination relay and call discriminator means having its input coupled to said input distributor through said line equipment and having its outputs selectively connectable to said call relay and said discrimination relay for actuating said discrimination relay in response to detection of high speed operation at its input for ensuring the change-over in operation of said exchange to said high speed operation.

2. A device according to claim 1, characterized in that said call discriminator means includes means for actuating , during caller subscriber communication, the engagement of said call relay, irrespective of the mode of operation, whether normal or high-speed.

3. A device according to claim 2, characterized in that said exchange further includes input selector switches connected to said line equipment having two levels at least associated with an identification wire, each level being allocated to one of said types of operation, and a charge-assessment device connected to said identification wire such that the charge-assessment device is informed of the call number to be considered for charging the cost.

4. A device according to claim 3, characterized in that said call discriminator means includes means for engaging said discrimination relay only in high-speed communication in both caller and called subscriber operation.

5. A switching device according to claim 1, characterized in that said exchange further includes a charge-assessment device and input selector switches having a single input level connected to said line equipment, one wire of said connector switches being connected to said charge-assessment device , and further includes a relay contact of said discrimination relay connected in a path between a charge-assessment identifier and a route indicator and said charge-assessment device for providing a communication path from said charge-assessment identifier and said wire to said route indicator and said charge-assessment device during high speed communication.

6. A device according to claim 5, characterized in that said call discriminator means is a modular plug-in device so that a subscriber to normal operation may obtain the possibility of double operation by placing in position said call discriminator.

7. A device according to claim 5, characterized in that said call relay is controlled directly by the telegraphic positive polarity received by the subscriber's equipment, said call discriminator means controlling only the discrimination relay only in response to detection of a call for a high-speed communication, said call discriminator means serving to hold said call relay during reception of a negative impulse of such high-speed communication request.

8. A device according to claim 7, further including means for engaging said call discriminator means and the said call relay only in calling-subscriber operation.

9. A device according to claim 8, further comprising means for short-circuiting the contacts of said discrimination relay so as to provide for subscriber high speed communication without use of said call discriminator means.

10. A device according to claim 1, characterized in that said exchange is provided with a relay panel comprising said line equipment, said call discriminator means and said discrimination relay, said discriminator means being provided as a removable plug-in module.

* * * * *

UNITED STATES PATENT OFFICE
CERTIFICATE OF CORRECTION

Patent No. 3,673,316 Dated June 27, 1972

Inventor(s) Claude Rousseau

It is certified that error appears in the above-identified patent and that said Letters Patent are hereby corrected as shown below:

Page 1, left hand column, item [30] add the following foreign application priority data -- October 31, 1969 France PV 6937584 --

Signed and seled this 29th day of May 1973.

(SEAL)
Attest:

EDWARD M.FLETCHER,JR.
Attesting Officer

ROBERT GOTTSCHALK
Commissioner of Patents